Figure 1:
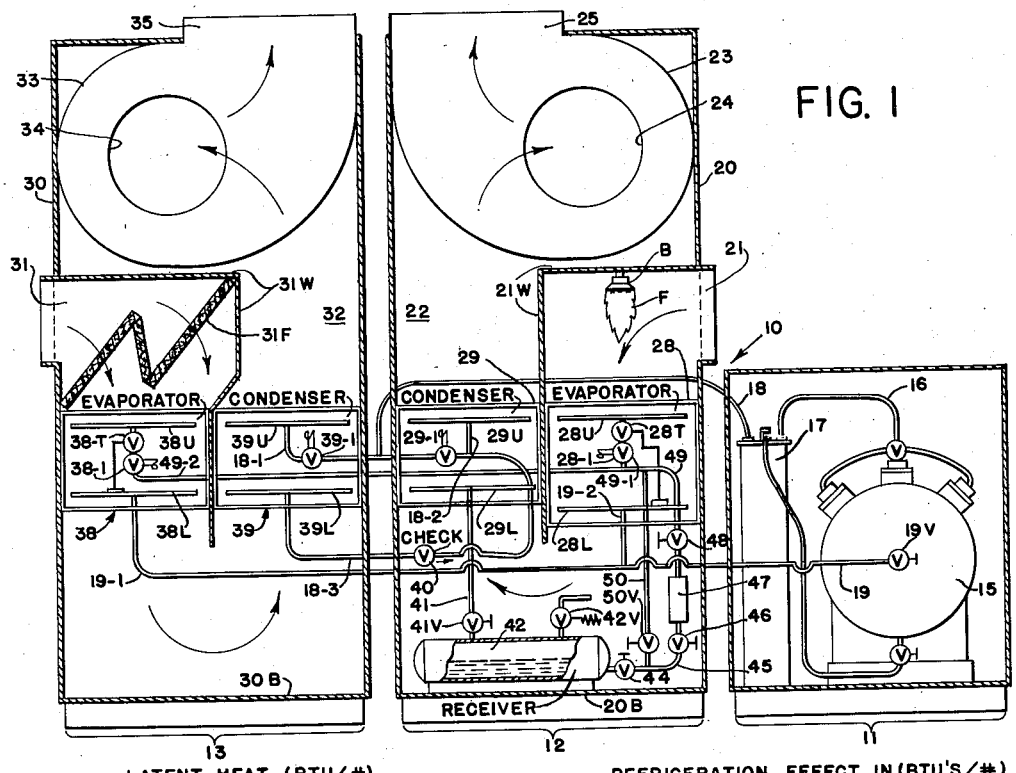

Dec. 2, 1952     R. H. BURGESS     2,619,812

HEAT PUMP APPARATUS

Filed June 22, 1950

NOTE— LATENT HEAT EQUALS REFRIGERATING EFFECT IF LIQUID IS COOLED TO SATURATION TEMPERATURE BEFORE ENTERING EVAPORATOR.

INVENTOR:
RUSSELL H. BURGESS

BY: *Wallace and Cannon*

ATTORNEYS:

Patented Dec. 2, 1952

2,619,812

UNITED STATES PATENT OFFICE 2,619,812

HEAT PUMP APPARATUS

Russell H. Burgess, Chicago, Ill., assignor to Drying Systems, Inc., Chicago, Ill., a corporation of Illinois Application June 22, 1950, Serial No. 169,653

9 Claims. (Cl. 62—129)

This invention relates to building heating and cooling systems of the type known popularly as heat-pump systems in which processes of refrigeration are employed in such a way as to utilize the outside air as a source of temperature difference, and particularly this invention relates to the attainment of a sub-cooling action in the refrigerant of the system so as to attain more efficient operation of the system, particularly in the heating cycle thereof.

It is recognized that in some applications of refrigerating systems, efforts have been made to sub-cool the refrigerant, but in such prior efforts along this line, the efficiency of the system as a whole has not been increased to any material extent because the sub-cooling action on the liquid refrigerant has been based upon the use of the refrigeration system itself rather than upon some independent source of cooling media.

In view of the foregoing, it is an important object of the present invention to enable a heating and cooling system of the heat-pump type to be rendered more efficient, particularly in its heating cycle, and an object related to the foregoing is to accomplish this by sub-cooling the refrigerant in a simple and expeditious manner. A further and related object is to enable such sub-cooling of the refrigerant to be attained through the use of structural elements of the heat-pump system which are required in normal or conventional operation, thereby to enable the increase in efficiency of the system as a whole to be attained without the addition of any objectionable amount of structure.

Other and further objects of the present invention will be apparent from the following description and claims and are illustrated in the accompanying drawing which, by way of illustration, shows a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

Figure 2:
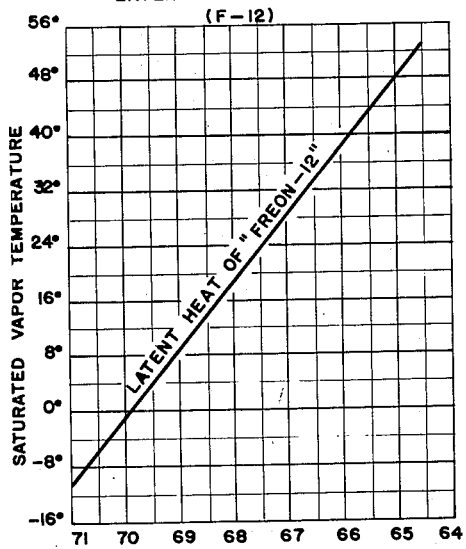
Figure 3:
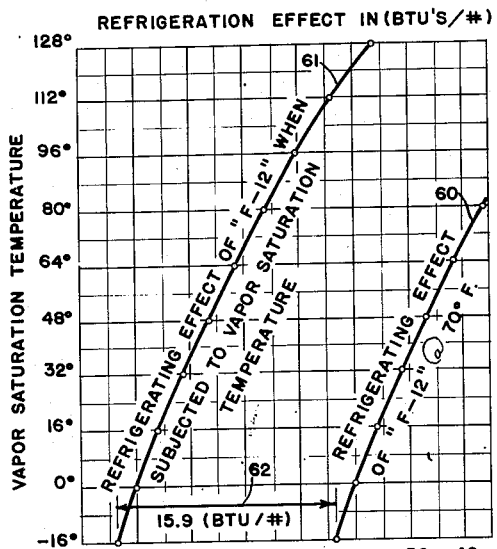

In the drawing:

Fig. 1 is a schematic view illustrating a heat-pump system for heating and cooling buildings and the like and embodying the features of the present invention; and Figs. 2 and 3 are charts showing the theoretical basis for increase in efficiency that is attained through the present system.

For purposes of disclosure, the invention is herein illustrated as embodied in a heat-pump system 10 having a conventional compressor unit 11, an outside air circulating unit 12, through which the outside air is circulated to attain selective heating or cooling of the refrigerant, as will hereinafter be described, and an inside air circulating unit 13, through which air from the inside of the building is circulated so as to be either heated or cooled by the refrigerant, as will hereinafter be described.

The circulating unit 11 embodies a conventional motor-driven compressor 15 having a hot gas discharge line 16 to an oil separator unit 17, from which the hot gas is then discharged through a line 18 so as to be supplied to elements of the units 12 or 13 selectively, as will hereinafter be described, and the compressor 15 has a return gas suction line 19 that is associated selectively with elements of the units 12 and 13, as will be described.

The unit 12 is in the form of an upright casing 20 into which air from the outside of the building may be drawn through an inlet 21. This inlet 21, as herein shown, is through the side wall of the housing 20, and the air that thus enters is then directed downwardly by inside partition walls 21W, the vertical one of the walls 21W being substantially midway between the opposite side wall of the housing 20, and this wall terminating upwardly a substantial distance from the bottom wall 20B of the housing so that the air may be discharged from the bottom of this vertical passage and may then move upwardly through a vertical passage 22 within the housing to a blower 23 that is mounted in the upper portion of the housing 20. This blower has an intake 24 and a discharge outlet 25 so that the outside air, after passing through the passages 21 and 22, is discharged to the outside of the building through the passage 25.

The passage 21 is provided with an evaporator unit 28, while the passage 22 has a condenser 29 mounted therein, and the evaporator 28 and the condenser 29 are preferably of the construction disclosed for such units in my Patent No. 2,431,228, patented November 18, 1947. The evaporator 28 has an upper header 28U and a lower header 28L, and these headers are associated or connected by heat transfer tubes having the streamlined form and relationship described in my aforesaid patent. Similarly, the condenser 29 has an upper header 29U and a lower header 29L that are connected by streamlined heat transfer tubes positioned and related in the manner described in such patent.

The unit 13 is somewhat similar to the unit 12 in its form and structure in that it comprises an upright housing 30 with a lateral inlet passage 31 through which air from the inside of a building may be drawn into the housing 30. Internal walls 31W serve to extend the passage 31 in a downward direction, and the vertical one of the walls 31W terminates short of the bottom wall 30B of the housing 30, so that air from the lower end of the passage 31 may reverse its direction and move upwardly in the housing 30 through a vertical passage 32 disposed adjacent to the other side of the housing 31. It will be noted that the inlet passage 30 is in the present instance provided with a series of filters 31F, so that dust will be removed from the air in the conventional manner. Near the upper end of the housing 30, a blower 33 is mounted so that air from the passage 32 may enter the inlet 34 of the blower for discharge through an outlet opening 35 to the air distributing ducts of the building.

The passage 31 has an evaporator 38 mounted therein, while the passage 32 has a condenser 39 mounted therein, and the evaporator 38 and the condenser 39 are preferably of the form and construction illustrated in my aforesaid patent. The evaporator 38 has upper and lower headers 38U and 38L which are associated in the manner described in my aforesaid patent, while the condenser 39 has upper and lower headers 39U and 39L that are also formed and arranged in accordance with such prior patent. It will be observed that the tubes or coils of the elements 28, 29, 38 and 39 are not shown in the drawings, and that the inlets for these units are afforded by inlet headers 28U, 29U, 38U and 39U, rather than by capillary tubes as in my aforesaid patent. Such inlet headers may be constructed as shown in my copending application, Serial No. 169,654, filed June 22, 1950. Before describing the different cycles of operation of the system, the several physical elements embodied in the system will be described. Thus, as shown in Fig. 1, the suction line 19 to the compressor is extended through branch lines 19—1 and 19—2, respectively, to the lower headers 38L and 28L, and at the compressor the suction line 19 includes a manually operable service valve 19V.

The hot gas line 18 is extended to a first branch line 18—1 which includes a normally closed, solenoid opened control valve 39—1, whereby flow of hot gas to the condenser 39 may be controlled. The hot gas line 18 also has an extension or branch 18—2 connected to the upper header 29U of the condenser 29, and this branch 18—2 includes a normally closed, solenoid opened control valve 29—1 whereby the flow of hot gas to the condenser 29 may be governed. A further extension 18—3 is extended from the branch 18—2 to the lower header 39L of the condenser 39, but this extension 18—3 includes a check valve 40 which permits flow of gas for refrigerant only in the direction indicated by the arrow in Fig. 1 or, in other words, only from the header 39L and through the extension 18—3 and toward the extension 18—2, this being for purposes of the present invention, and such purposes will be described hereinafter.

The lower header 29L of the condenser 29 is connected by a line 41 and a manual valve 41V to a receiver 42 which has a conventional relief valve 42V. From the receiver 42, liquid refrigerant may pass through a manual valve 44, a line 45, and a manual valve 46 to a conventional drying unit 47, from which the refrigerant may pass through a manual valve 48 and a line 49. The line 49 has a branch 49—1 which is connected through valves that will hereinafter be described to the upper header 28U of the evaporator 28. A further extension 49—2 of the line 49 is connected through similar control valves, that will be described, to the upper header 38U of the evaporator 38. If desired, the dryer 47 may be by-passed through a line 50 that includes a manual valve 50V, and this by-pass extends between the line 45 and the line 49, as will be evident in Fig. 1.

The branch line 49—1 includes a normally closed, solenoid opened valve 28—1, and between the valve 28—1 and the header 28U an automatic valve 28T is provided in the branch line 49—1, this valve 28T being a conventional thermostatic expansion valve which is governed, as schematically indicated in the drawing, by the temperature of the refrigerant in the header 28L. Similarly, the branch line 49—2 includes a normally closed, solenoid opened control valve 38—1, and between this valve and the header 38U, a thermostatic control valve 38T is afforded which, as diagrammatically illustrated in the drawing, is controlled by the temperature of the refrigerant in the header 38L.

It should be pointed out that the intake passage 21 of the unit 12 may have a gas burner B mounted therein, so that a flame F may be produced in this passage, this arrangement being effective to increase the efficiency of the system and being described in detail in my copending application, Serial No. 169,652, filed June 22, 1950.

When the system above described is to be changed from its heating operation to its cooling operation, or vice versa, this may be accomplished in a simple manner through reversing of a control switch mechanism that governs the solenoid valves 28—1, 29—1, 38—1 and 39—1. In the cooling cycle of the system, the condenser 29 is rendered operative in the outside air circulating system so as to be cooled by the outside air that is circulating through the unit 12, while the evaporator 38 of the unit 13 is rendered effective so that refrigerant is circulated therethrough so as to cool the inside air that is circulated through the unit 13. In such cooling operation, the evaporator 28 and the condenser 39 are rendered ineffective through the control of the aforesaid solenoid valves. Generally considered, the heating cycle of the present system utilizes the evaporator 28 to absorb heat from the outside air, as such air is circulated through the unit 12, while the condenser 39 is utilized for heating the inside air that is circulated through the unit 13, and in such operation, and in accordance with the present invention, the condenser 29 is utilized as a sub-cooler for sub-cooling the refrigerant before it is circulated through the evaporator 28. Thus, in the heating cycle of the present system, all of the evaporator and condenser units are utilized except the evaporator unit 38.

Thus, with particular reference to the control of the several solenoid valves, it should be noted that in the cooling cycle the valves 29—1 and 38—1 are opened, while the valves 28—1 and 39—1 are closed. Conversely, in the heating cycle, the valves 28—1 and 39—1 are opened, while the valves 29—1 and 38—1 are closed.

With the valves set for operation of the system in its cooling cycle, the hot refrigerant gas from the line 18 is passed to the condenser 29 through the open valve 29—1 and the branch line 18—2, it being noted that flow of the hot gas through the line 18—3 is prevented by the check valve 40.

The hot gas is condensed to a liquid in the condenser 29 and passes through the line 41 to the receiver 42. The liquid refrigerant from the receiver 42 passes through the line 45, the dryer 47, the line 49 and the branch line 49—2 and through the open solenoid valve 38—1 and the thermostatic extension valve 38T to the evaporator 38, where it serves to cool the air that is being circulated through the unit 13. The refrigerant is thus vaporized in the evaporator 38 and passes through the compressor suction line 19 to the compressor 15 so as to complete the cycle.

In the heating cycle of the present system, the hot gas from the line 18 passes through the open solenoid valve 39—1 and the branch 18—1 to the condenser 39 so that this hot gas is effective to heat the air that is being circulated through the unit 13. The action of the condenser 39 serves to liquify the refrigerant, and this liquid passes through the branch line 18—3, the check valve 40 and the branch line 18—2 to the condenser 29, where the relatively cold outside air that is being circulated through the unit 12 serves to sub-cool the refrigerant which is then discharged through the line 41 to the receiver 42. In this respect it will be noted that in the heating cycle of the system the valve 29—1 is closed.

The sub-cooled refrigerant then passes through the line 45, the dryer 47, the line 49 and the branch 49—1, and since the valve 28—1 is at this time open, such sub-cooled refrigerant enters the evaporator 28 where it is evaporated by the relative heating action of the air that is being circulated through the unit 12. The gaseous refrigerant then passes through the branch 19—2 to the suction line 19 of the compressor 15, thus completing the cycle of operation in the heating cycle.

It will be recognized that in the heating cycle of the system, the outside air that passes over the evaporator 28 gives up heat to the evaporator so that this outside air is in effect further cooled as it passes through the evaporator 28. Under prior practice in heat-pump systems, this air would be discharged without further use. In contrast to this, however, this further cooled air is directed past the condenser 29, which in the heating cycle is acting as a sub-cooler, and this materially increases the efficiency of the system in its heating cycle of operation.

In Figs. 2 and 3 of the drawings, graphs have been shown which illustrate the characteristics of a particular refrigerant that is quite widely used in the industry. Thus, Figs. 2 and 3 relate specifically to a refrigerant known as "Freon 12," this particular refrigerant being selected for purposes of illustration only, and it being noted that generally similar results and characteristics would be found for other refrigerants. Thus, in Fig. 2 of the drawings, the latent heat of this particular refrigerant is plotted against the saturated vapor temperatures, and, as noted on the drawing, the latent heat is recognized as being substantially equal to the refrigerating effect of the refrigerant if the liquid is cooled to saturation temperature before entering the evaporator. Proceeding from the values shown in Fig. 2, Fig. 3 has been prepared to show the comparative refrigerating effect of the refrigerant Freon 12 under the conditions in which it is normally utilized, and under the conditions under which it is utilized in accordance with the present invention. Thus, a curve 60 is shown in Fig. 3 illustrating a refrigerating effect for various vapor saturation temperatures when the refrigerant is delivered to the evaporator at substantially 70° F. In contrast to this, curve 61 illustrates the refrigerating effect of the same refrigerant when it is delivered to the evaporator at its vapor saturation temperature. These curves 60 and 61 are substantially parallel, and, as indicated at 62 in Fig. 3, these curves show that a net gain of substantially 15.9 B. t. u. per pound is gained through sub-cooling of the refrigerant, as taught under the present invention.

From the foregoing it will be evident that the present invention materially increases the efficiency of heat-pump systems and that this increase in efficiency is attained through the use of relatively simple and inexpensive structure primarily through the use of elements that form a part of such systems as heretofore used.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a heat-pump system having a refrigerant compressor and a receiver, an inside-air circulating passage including a first evaporator and a first condenser through which inside air from a building or the like to be heated or cooled is passed, an outside-air circulating passage including a second evaporator and a second condenser through which outside air is passed in succession, refrigerant piping including a plurality of control valves settable as a group to a first relation wherein refrigerant from said receiver is fed to said first evaporator to cool the air in said inside-air circulating passage and is returned to said compressor for compression after which it is passed through said second condenser to be condensed by the air in said outside-air circulating passage, said control valves being settable as a group to a second relation wherein hot gaseous refrigerant from said compressor is fed to said first condenser to heat the air in said inside-air passage and after being liquefied in said first condenser is passed through said second condenser to be sub-cooled by the refrigerated air in said outside-air circulating passage after which it is returned to said receiver, said valves in said second relation being effective to pass the sub-cooled liquid refrigerant from said receiver to said second evaporator and after evaporation in said second evaporator to return the gaseous refrigerant to said compressor for compression.

2. In a heat-pump system having a refrigerant compressor and a receiver, an inside-air circulating passage including a first evaporator and a first condenser through which inside air to be heated or cooled is passed, an outside-air circulating passage including a second evaporator and a second condenser through which outside air is passed in succession, suction line connections from the outlets of both of said evaporators to said compressor, a first liquid refrigerant line from said receiver to the inlet of said first evaporator and including a first liquid control valve, a second liquid refrigerant line from said receiver to the inlet of said second evaporator and including a second liquid control valve, a liquid return line from the outlet of said second condenser to said receiver, a hot gas line extended from said compressor and having a first branch to the inlet of said first condenser including a first gas control valve, and having a second branch to the inlet of said second condenser including a second gas control valve, a connection from the outlet of said first condenser to the inlet of said second condenser and including a check valve for allowing fluid flow therein only toward said second condenser, and valve control means for opening said first liquid control valve and said second gas control valve while closing said second liquid control valve and said first gas control valve to cause cooling operation of said system in respect to the inside air, and for closing said first liquid control valve and said second gas control valve while opening said second liquid control valve and said first gas control valve to heat the inside air in a heating cycle in which the outside air cooled by said second evaporator acts through said second condenser as a sub-cooler to sub-cool the liquid refrigerant and thereby increase the refrigerating effect of the refrigerant in the system.

3. In a heat-pump system having a refrigerant compressor and a receiver, an inside circulating passage including a first evaporator and a first condenser through which a first heat transfer fluid to be heated or cooled is passed, a second circulating passage including a second evaporator and a second condenser through which second passage a second fluid is passed so as to flow in heat transfer relation through said second evaporator and second condenser in succession, suction line connections from the outlets of both of said evaporators to said compressor, a first liquid refrigerant line from said receiver to the inlet of said first evaporator and including a first liquid control valve, a second liquid refrigerant line from said receiver to the inlet of said second evaporator and including a second liquid control valve, a liquid return line from the outlet of said second condenser to said receiver, a hot gas line extended from said compressor and having a first branch to the inlet of said first condenser including a first gas control valve, and having a second branch to the inlet of said second condenser including a second gas control valve, a connection from the outlet of said first condenser to the inlet of said second condenser and including a check valve for allowing fluid flow therein only toward said second condenser, and valve control means for opening said first liquid control valve and said second gas control valve while closing said second liquid control valve and said first gas control valve to cause cooling operation of said system in respect to the first heat transfer fluid, and for closing said first liquid control valve and said second gas control valve while opening said second liquid control valve and said first gas control valve to heat the said first heat transfer fluid in a heating cycle in which said second fluid after being cooled by said second evaporator acts through said second condenser as a sub-cooler to sub-cool the liquid refrigerant and thereby increase the refrigerating effect of the refrigerant in the system.

4. In a heat-pump system having a refrigerant compressor and a receiver, an inside circulating passage including a first evaporator and a first condenser through which a first heat transfer fluid to be heated or cooled is passed, a second circulating passage including a second evaporator and a second condenser through which second passage a second fluid is passed so as to flow in heat transfer relation through said second evaporator and second condenser in succession, suction line connections from the outlets of both of said evaporators to said compressor, a first liquid refrigerant line from said receiver to the inlet of said first evaporator and including a first liquid control valve, a second liquid refrigerant line from said receiver to the inlet of said second evaporator and including a second liquid control valve, a liquid return line from the outlet of said second condenser to said receiver, a hot gas line extended from said compressor and having a first branch to the inlet of said first condenser including a first gas control valve, and having a second branch to the inlet of said second condenser including a second gas control valve, and a connection from the outlet of said first condenser to the inlet of said second condenser and including a check valve for allowing fluid flow therein only toward said second condenser.

5. In a heat-pump system having a refrigerant compressor and a receiver, an inside-air circulating passage including a first evaporator and a first condenser through which inside air to be heated or cooled is passed, an outside-air circulating passage including a second evaporator and a second condenser through which outside air is passed in succession, suction line connections from the outlets of both of said evporators to said compressor, a first liquid refrigerant line from said receiver to the inlet of said first evaporator and including a first liquid control valve, a second liquid refrigerant line from said receiver to the inlet of said second evaporator and including a second liquid control valve, a liquid return line from the outlet of said second condenser to said receiver, a hot gas line extended from said compressor and having a first branch to the inlet of said first condenser including a first gas control valve, and having a second branch to the inlet of said second condenser including a second gas control valve, and a connection from the outlet of said first condenser to the inlet of said second condenser and including a check valve for allowing fluid flow therein only toward said second condenser.

6. In an air conditioning apparatus, the combination of first and second condensers connected together in series in such a manner that said first condenser serves as an air heater and the second condenser serves as a liquid sub-cooler, means for driving refrigerant through said two condensers for cooling and liquefying the refrigerant, an evaporator connecting said second one of said condensers to the means for driving the refrigerant from said one condenser through said evaporator for vaporizing the refrigerant, and means for driving separate streams of air through said condensers and said evaporator for varying the temperature of said air.

7. The process of heating a first fluid by driving it through a first condenser in which refrigerant in gaseous form gives up its heat to said first fluid so that the refrigerant is cooled and liquefied, and then passing such refrigerant through a second condenser and then through an evaporator, through which evaporator and second condenser a second fluid is being driven in succession in heat transfer relation, such refrigerant being sub-cooled in said second condenser by the action of said second fluid at a relatively low temperature, and said second fluid being substantially cooled to said relatively low temperature in said evaporator by the effect of the refrigerant being vaporized in said evaporator.

8. The process of heating a first fluid by driving it through a first condenser in which refrigerant in gaseous form gives up its heat to said first fluid so that said refrigerant is cooled and liquefied, sub-cooling such refrigerant by driving it through a second condenser through which a stream of a second fluid at relatively low temperature is passing, and then transforming the sub-cooled refrigerant into gaseous form in an evaporator during the passage of said stream of said second fluid through the evaporator so that said second fluid is cooled to said relatively low temperature prior to its passage through said second condenser.

9. The process of heating inside air in the air circulating system of a building by driving such air through a condenser in which refrigerant in gaseous form is being cooled and liquefied, sub-cooling such refrigerant by driving it through a second condenser through which refrigerated outside air is passing, and then transforming the refrigerant into gaseous form in an evaporator in which heat is being transferred to the refrigerant from the aforesaid stream of outside air as such stream of outside air passes through the evaporator and prior to passage of outside air through said second condenser.

RUSSELL H. BURGESS.

REFERENCES CITED

The following references are of record in the file of this patent:

UNITED STATES PATENTS

| Number | Name | Date |
|---|---|---|
| 2,376,859 | Benn | May 29, 1945 |
| 2,474,304 | Clancy | June 28, 1949 |
| 2,530,681 | Clancy | Nov. 21, 1950 |